United States Patent [19]
Chen

[11] Patent Number: 5,530,432
[45] Date of Patent: Jun. 25, 1996

[54] PHOTO MONITORING APPARATUS WITH VISUAL/AUDIO ALARM

[76] Inventor: Mark P. C. Chen, 3F, No. 14, Alley 18, Lane 136, Huna Shan Rd. Sec. 1, Taipei, Taiwan

[21] Appl. No.: 383,305

[22] Filed: Feb. 3, 1995

[51] Int. Cl.⁶ .................................................. G08B 17/12
[52] U.S. Cl. ........................... 340/600; 340/691; 356/221
[58] Field of Search ................... 340/600, 555, 340/691; 362/5; 356/221, 226, 222, 215

[56] References Cited

U.S. PATENT DOCUMENTS

| | | | |
|---|---|---|---|
| 2,972,930 | 7/1958 | Norwood | 356/215 |
| 3,652,168 | 3/1972 | Yanagi | 356/221 |
| 3,709,615 | 1/1973 | Blakeslee | 356/215 |
| 3,765,006 | 10/1973 | Takahashi | 340/600 |
| 3,786,460 | 1/1974 | Kalenback | 340/600 |
| 3,878,496 | 4/1975 | Erickson | 340/600 |
| 3,999,061 | 12/1976 | McLaughlin | 356/215 |
| 4,155,077 | 5/1979 | Rohan | 340/600 |
| 4,242,670 | 12/1980 | Smith | 340/600 |
| 4,255,745 | 3/1981 | Rohan | 340/600 |
| 4,400,087 | 8/1983 | Nakayama | 356/215 |
| 4,538,218 | 8/1985 | Watson | 356/215 |
| 4,637,721 | 1/1987 | Naruse | 356/215 |
| 5,281,952 | 1/1994 | Dragon | 340/600 |

*Primary Examiner*—Brent A. Swarthout
*Assistant Examiner*—Albert K. Wong
*Attorney, Agent, or Firm*—Bacon & Thomas

[57] ABSTRACT

A photo monitoring apparatus including a photoresistor, a series of shunt resistors, and a comparator IC, wherein the comparator IC provides an output signal to a LED and a diaphragm speaker, when the voltage from the shunt resistors drops below a pre-set reference voltage, causing the LED to give light and the diaphragm speaker to produce a warning sound. The shell of the photo monitoring apparatus is installed with a digital time display controlled by a time circuit to indicate time.

2 Claims, 6 Drawing Sheets

PHOTO MONITORING APPARATUS WITH VISUAL/AUDIO ALARM

BACKGROUND OF THE INVENTION

The present invention relates to a handy photo monitoring apparatus which detects ambient light intensity and gives a visual and audio warning signal when the intensity of ambient light drops below a predetermined value. The photo monitoring apparatus can also be worn on the body as a personal ornamental device.

Various instruments have been disclosed for measuring luminous intensity in the reading and writing environment, and have appeared on the market. Because these commercially available instruments are specifically designed for measuring luminous intensity in the reading and writing environment, they cannot be used to measure intensity of light in working places. Regular photo detecting apparatus for this purpose are commonly heavy, not precise, and not durable. Furthermore, they are monotonous because they simply use a light or audio alarm to give a warning signal.

SUMMARY OF THE INVENTION

The present invention has been accomplished under the circumstances in view. It is one object of the present invention to provide a photo monitoring apparatus which uses an integrated circuit to achieve the photo monitoring job, and therefore it is durable and precise in use. It is another object of the present invention to provide a photo monitoring apparatus which is practical for monitoring different ranges of luminous intensity. It is still another object of the present invention to provide a photo monitoring apparatus which provides an audio warning signal as well as a visual warning signal when the light intensity of the detected area drops below a set value. It is still another object of the present invention to provide a photo monitoring apparatus which can be carried with oneself and used as a personal ornamental item. It is still another object of the present invention to provide a handy photo monitoring apparatus which has a time display for indicating time. It is still another object of the present invention to provide a handy photo monitoring apparatus which is equipped with a looking-glass.

DETAILED DESCRIPTION OF THE PREFERRED EMBODIMENT

Figure 1:
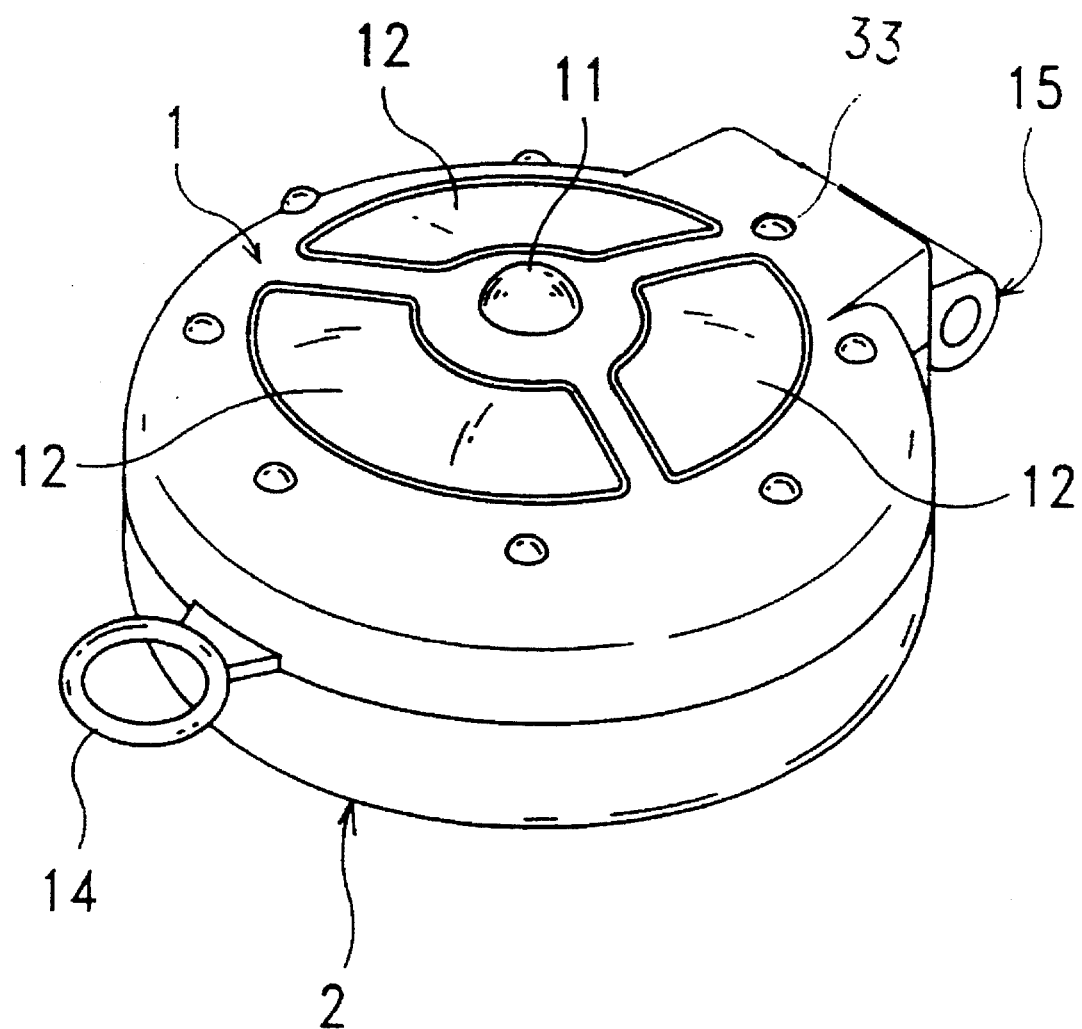
FIG. 1 is an elevational view of a photo monitoring apparatus according to the present invention.
Figure 1A:
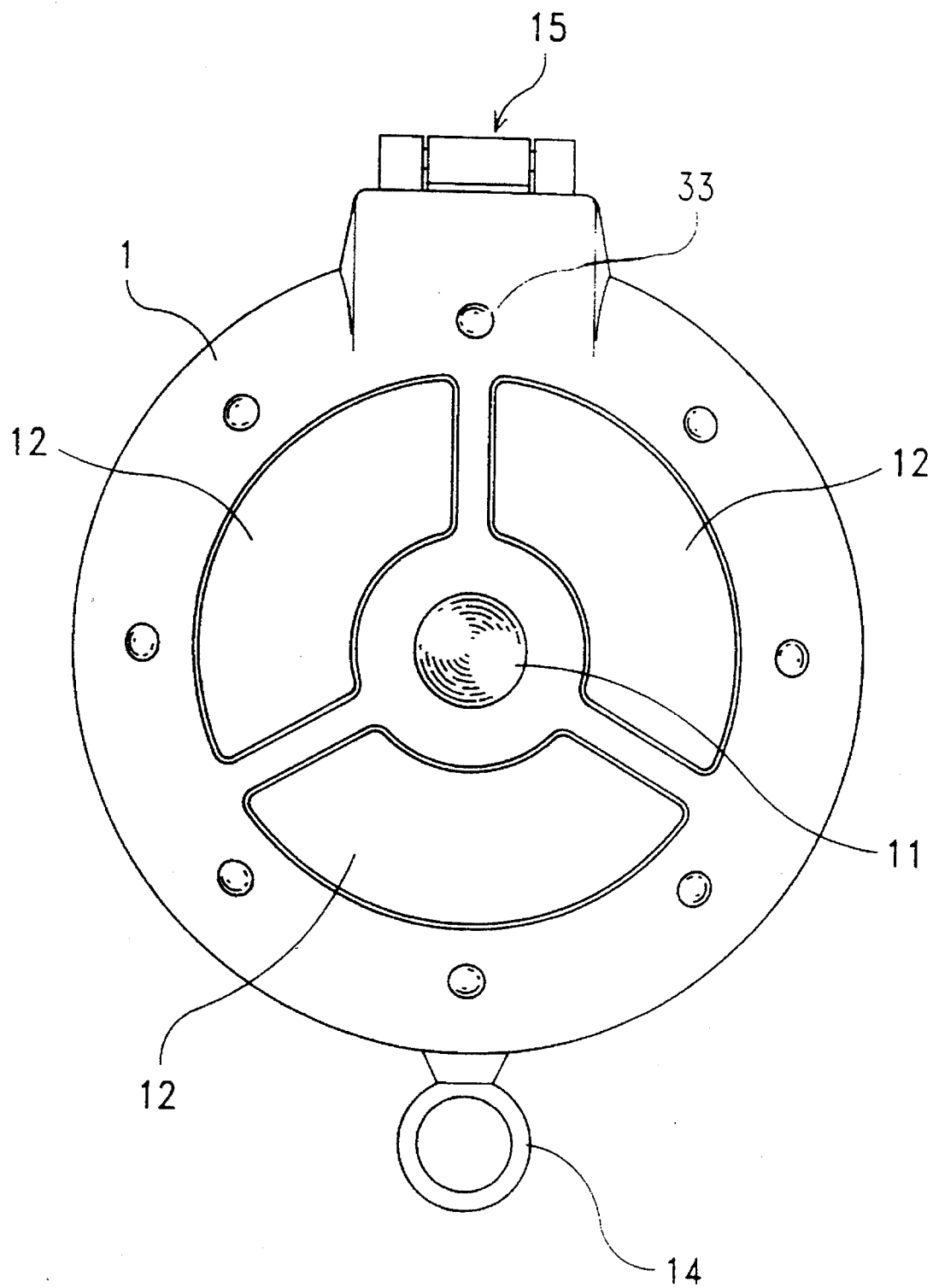
FIG. 1A is a front side view of the photo monitoring apparatus shown in FIG. 1.
Figure 2:
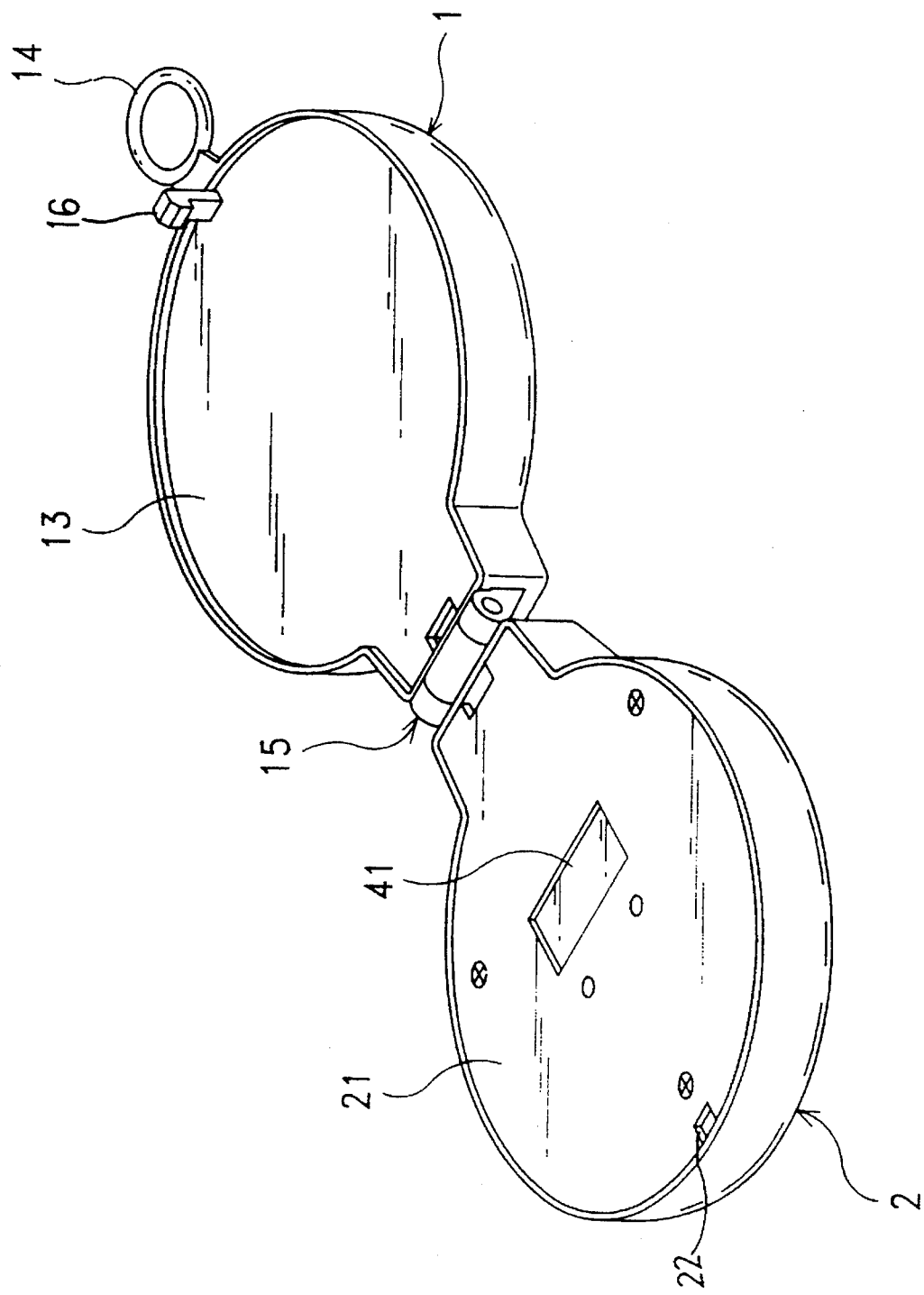
FIG. 2 shows the photo monitoring apparatus of FIG. 1 opened.

Referring to FIGS. 1 and 1A, a photo monitoring apparatus in accordance with the present invention is generally comprised of an upper shell 1 and a bottom shell 2. The upper shell 1 and the bottom shell 2 are hinged together by a hinge 15, therefore the upper shell 1 can be opened from the bottom shell 2, as shown in FIG. 2, or closed on the bottom shell 2, as shown in FIG. 1. The upper shell 1 and the bottom shell 2 may be made of any of a variety of shapes fitting each other, for example, the shape of a saucer. The upper shell 1 a dome-like light-penetrable hood 11 on the top at the center, three key caps 12 respectively mounted within a respective key hole (not shown) around the hood 11, and a hanging ring 14 extended from the front side remote from the hinge 15 for mounting a key chain or the like. Furthermore, a light emitting diode 33 of the light intensity detecting circuit 30 of a circuit board 3 (it will be described further) is mounted on the top side of the upper shell 1 for giving a visual alarm signal.

Figure 1B:
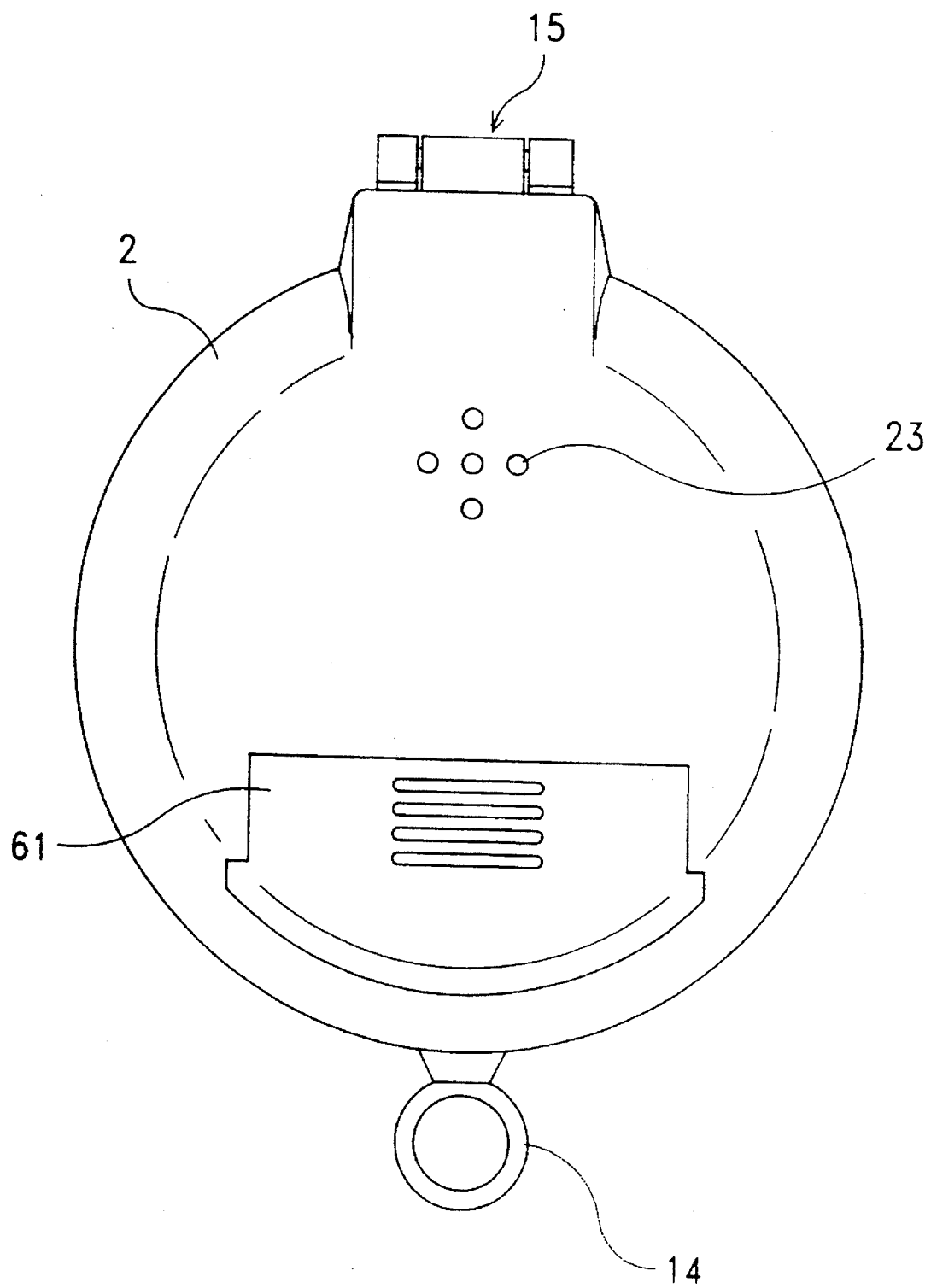
FIG. 1B is a rear side view of the photo monitoring apparatus shown in FIG. 1.
Figure 3:
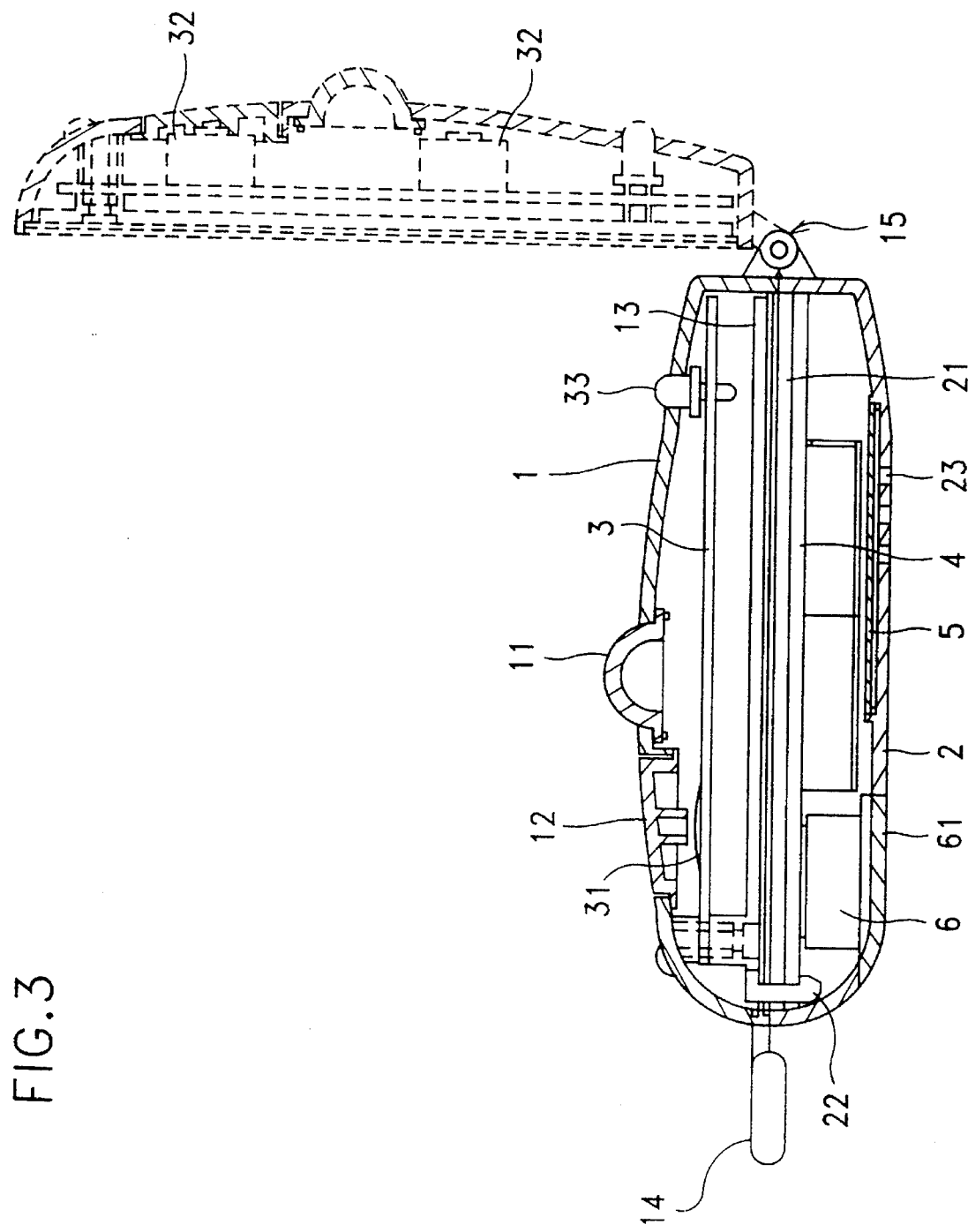
FIG. 3 is a sectional view of the photo monitoring apparatus shown in FIG. 1, showing the upper shell moved from the open position to the close position.

Referring to FIGS. 1B, 2, and 3, the upper shell 1 and the bottom shell 2 are covered with a respective inner cover board 13 or 21. The inner cover board 21 of the bottom shell 2 is mounted with a digital time display 41 connected to a time circuit 4 inside the bottom shell 2 for indicating time. A looking-glass or picture (not shown) may be mounted on the inner cover board 13 of the upper shell 1. The aforesaid circuit board 3 is mounted within the upper shell 1 and covered by the cover board 13. The circuit board 3 comprises a light intensity detecting circuit 30 (see FIG. 4), a three contacts 31 respectively disposed below the key caps 12 on the upper shell 1, and three key switches 32 respectively suspended between the contacts 31 and the key caps 12. The bottom shell 2 further comprises a battery chamber 6 covered with a battery lid 61 to hold a battery set 61 (see FIG. 4), a diaphragm speaker 5 on the inside, and a plurality of holes 23 corresponding to the diaphragm speaker 5 for output of sound from the diaphragm speaker 5. The upper shell 1 further comprises a hook 16 raised from the inner cover board 13. When the upper shell 1 and the bottom shell 2 are losed, the hook 16 hooks in a hook hole 22 on the inner cover board 21 to hold the upper shell 1 and the bottom shell 2 in the close position.

Figure 4:
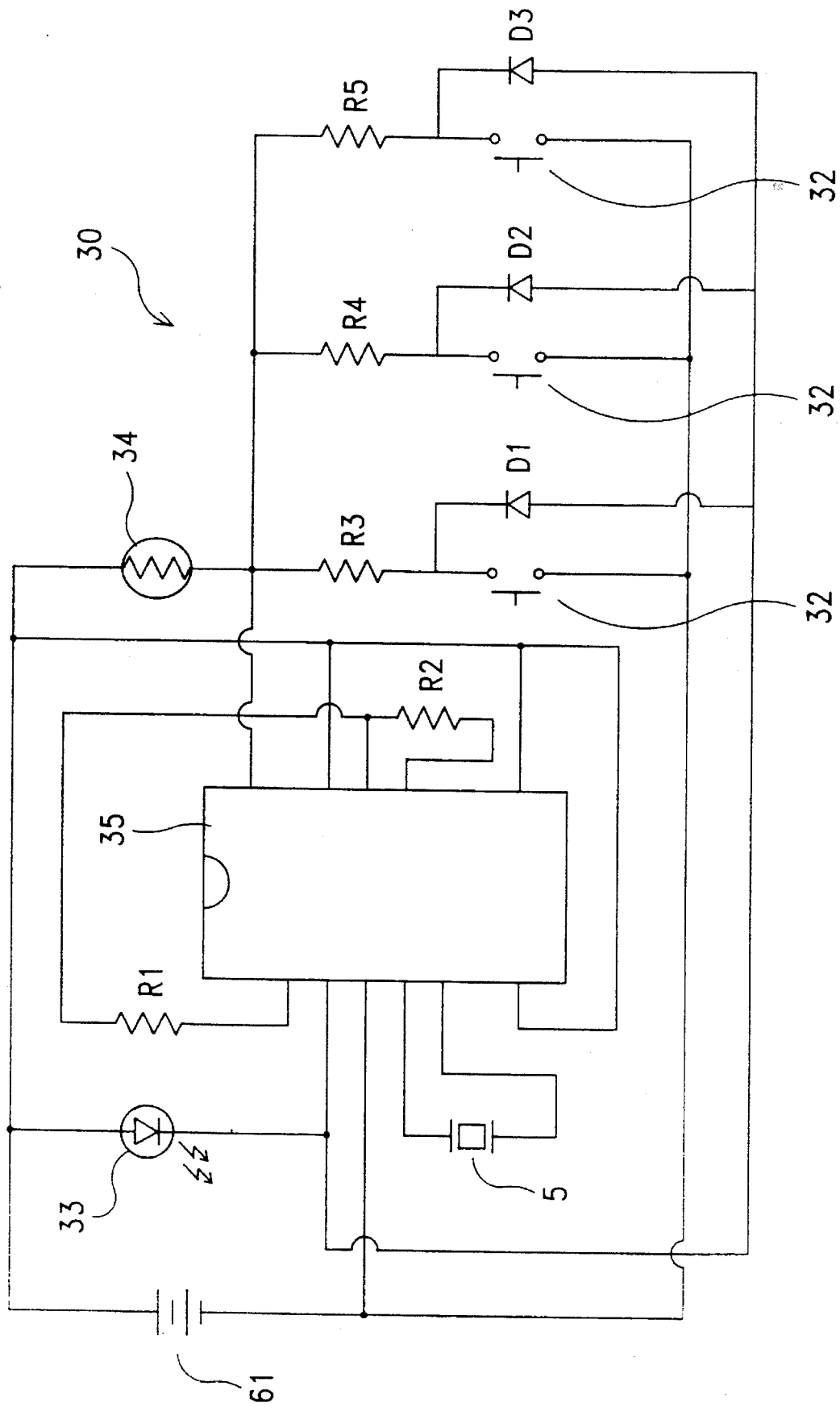
FIG. 4 is a circuit diagram of a light intensity detecting circuit according to the present invention.

Referring to FIG. 4, the aforesaid light intensity detecting circuit 30 comprises a photoresistor 34 disposed below the aforesaid dome-like light-penetrable hood 11, the aforesaid light emitting diode 33, shunt resistors R3–R5, and a comparator IC 35. The photoresistor 34, the shunt resistors R3–R5 and the aforesaid key switches 32 are respectively connected in series. The connecting point between the photoresistor 34 and the shunt resistors R3–R5 is connected to the comparator IC 35. The comparator IC 35 compares the voltage from the shunt resistors R3–R5 with a respective pre-set reference voltage so as to determine if to provide an output signal to the light emitting diode 33 and the diaphragm speaker 5. The impedance of the shunt resistors R3–R5 is indirectly proportional to the light intensity detected by the photoresistor 34, and the shunt resistors R3–R5 are respectively set for light intensity range of 750 LUX, 500 LUX, 250 LUX respectively. When the battery set 61 is connected to the shunt resistors R3–R5, the voltages at the shunt resistors R3–R5 vary with the impedance of the photoresistor 34. When the voltages of the shunt resistors R3–R5 drop below a respective predetermined value, the comparator IC 35 will give an output signal to the diaphragm speaker 35 and the light emitting diode 33, upon the switching of the respective key switch 32, causing the diaphragm speaker 35 to produce a warning sound and the the light emitting diode 33 to give light. For example, when the ambient light drops below 750 LUX, the diaphragm speaker 35 and the light emitting diode 33 will be triggered when the corresponding key cap 12 is depressed to switch on the corresponding key switch 32.

While only one embodiment of the present invention has been shown and described, it will be understood that various modifications and changes could be made without departing from the spirit and scope of the invention.

What is claimed is:

1. A photo monitoring apparatus comprising:

an upper shell covered with an inner cover board arranged to support an ornamental item, said upper shell comprising a dome-like light-penetrable hood on a top side thereof at the center, a plurality of holes spaced around said hood, a plurality of caps respectively mounted within said holes, said caps being attached to switches and arranged to move within the holes to activate the switches when pushed, and a hanging ring extended from a front side thereof, said hanging ring forming a means by which the apparatus may be worn on the body of a person, the inner cover board of said upper shell having mounted thereon a hook;

a bottom shell covered with an inner cover board and hinged to said upper shell by a hinge, said bottom shell comprising a time circuit disposed on the inside, a digital time display mounted on the inner cover board of said bottom shell and controlled by said time circuit to indicate time, a battery chamber, which holds a battery set, a battery lid covered on said battery chamber, and a diaphragm speaker, the inner cover board of said bottom shell has a hook hole, which receives said hook when said upper shell is covered on said bottom shell, wherein when the bottom and upper shells are pivoted to an open position about said hinge, said time display and any ornamentation on said inner cover board are visible, the first inner cover board and upper shell together forming a housing for a circuit board mounted inside said upper shell, the second inner cover board and bottom shell together forming a housing for said time circuit speaker, and battery chamber;

said circuit board comprising a plurality of contacts which are engaged by said switches when said caps are pushed; and a photo detecting circuit mounted on said circuit board and connected to said contacts, said diaphragm speaker, and said battery set, said photo detecting circuit comprising a photo resistor disposed below said hood, a light emitting diode mounted on said upper shell on the outside, a plurality of shunt resistors respectively connected to said contacts, and a comparator IC, said photoresistor and said shunt resistors and said switches being respectively connected in series, the connecting point between said photoresistor and said shunt resistors being connected to said comparator IC, said comparator IC being to compare the voltages from said shunt resistors with a respective pre-set reference voltage, and said comparator IC providing an output signal to said fight emitting diode and said diaphragm speaker, such that when the voltage from one shunt resistor drops below the respective pre-set reference voltage and the corresponding key switch is switched on by the corresponding cap, said light emitting diode emits light and said diaphragm speaker produces a warning sound.

2. The photo monitoring apparatus of claim 1 wherein said bottom shell comprises a plurality of holes adjacent to said diaphragm speaker.

* * * * *